United States Patent [19]

Roberts et al.

[11] Patent Number: 5,425,060
[45] Date of Patent: Jun. 13, 1995

[54] MECHANISM FOR REDUCING TIMING JITTER IN CLOCK RECOVERY SCHEME FOR BLIND ACQUISITION OF FULL DUPLEX SIGNALS

[75] Inventors: Richard D. Roberts; Mark A. Webster, both of Palm Bay, Fla.

[73] Assignee: Harris Corporation, Melbourne, Fla.

[21] Appl. No.: 8,425

[22] Filed: Jan. 25, 1993

[51] Int. Cl.⁶ .................. H04L 7/00; H04L 25/36; H04L 25/40
[52] U.S. Cl. .................. 375/371; 375/376; 364/724.1; 380/34
[58] Field of Search .............. 375/118, 120, 24, 10; 455/9, 10, 63, 67, 180.3; 329/311; 364/724.1; 370/32.1; 380/34

[56] References Cited

U.S. PATENT DOCUMENTS 4,862,484  8/1989  Roberts ............... 375/120 X
4,953,186  8/1990  Levy et al. ............ 375/118
5,093,847  3/1992  Cheng ................... 375/118

Primary Examiner—Stephen Chin
Assistant Examiner—Bryan E. Webster
Attorney, Agent, or Firm—Charles Wands

[57] ABSTRACT

Timing jitter in the clock recovery loop of a 'blind' signal acquisition receiver employing a square law detector in a phase lock loop signal flow path is substantially reduced by adaptively adjusting the parameters of the loop's pre-filter, so as to compensate for conjugate antisymmetric components in the spectrum of the monitored signal of interest. The signal timing recovery signal processing mechanism includes a filter parameter adjustment operator which controllably sets the weighting parameters of a baseband prefilter, so that the filtered signal does not possess conjugate antisymmetry about the Nyquist frequency and the spectrum of the filtered signal is essentially conjugate symmetric.

22 Claims, 8 Drawing Sheets

MECHANISM FOR REDUCING TIMING JITTER IN CLOCK RECOVERY SCHEME FOR BLIND ACQUISITION OF FULL DUPLEX SIGNALS

CROSS-REFERENCE TO RELATED APPLICATIONS

The present invention relates to subject matter disclosed in co-pending application Ser. No. 930,728, filed Aug. 14, 1992, entitled "High Impedance Directional Signal Separator for Extracting and Separating Respective Signalling Components of a Wireline Full-Duplex Digital Data Link," by M. Webster et al, assigned to the assignee of the present application, and co-pending application Ser. No. 969,788 filed Oct. 29, 1992, entitled "Blind Signal Separation and Equalization of Full-Duplex Amplitude Modulated Signals on a Signal Transmission Line," by M. Webster et al, which is a continuation-in-part of application Ser. No. 930,728, filed Aug. 14, 1992 and is also assigned to the assignee of the present application.

1. Field of the Invention

The present invention relates in general to communication systems and is particularly directed to a mechanism for reducing clock jitter in a clock recovery scheme, particularly one that may be employed for use with a full-duplex communication link, such as a pulse amplitude modulation (PAM) signal-conveying telephone link, in which respective components of bi-directional PAM transmissions may be extracted and separated by means of a blind acquisition signal acquisition and processing network.

2. Background of the Invention

Full-duplex communication links are employed in a variety of communications systems, such as telephone networks over which pulse amplitude modulated (PAM) signals are conveyed. In such a system, the signal being conveyed over the link would typically have a characteristic illustrated in FIG. 1, in which the level of the analog waveform represents digital logic level information. For telephone wireline communication signalling the PAM signal is comprised of the voltage amplitude values +1, +3, −1, −3 volts).

Occasionally, as in the case of performance of a routine maintenance operation, it may be necessary to gain access to the link in order to monitor one or both of the signal components that form the full duplex signal. Thus, with reference to an 'east-west' full duplex communication system diagrammatically illustrated in FIG. 2, if a monitoring device, such as an oscilloscope, is coupled to communication link 11, while only 'west' user A is transmitting, then the data waveform Sa for user A would be observed. If only 'east' user B is transmitting, then the observed waveform on the transmission link 11 would be waveform Sb belonging to user B.

Because a full-duplex data link is one in which digital communications take place simultaneously between 'west' user A and 'east' user B at the opposite ends of the link, then a device (shown in broken lines 13) that is coupled to link 11 to monitor communication signals on the link must be able to both intercept the two signals and separate them. Once the two signals are separated, the individual signals can be processed (via a demodulator) to recover the digital information sourced from user A and/or user B.

Operationally, each user can recover the other's data through waveform separation resulting from a priori knowledge of the transmit waveform. Techniques used to accomplish this include transformer hybrids and digital echo cancellation. It is assumed that the demodulators contain the necessary signal processing hardware and algorithms to compensate for any distortion present in the separated signals due to the two wire transmission line.

In the case of merely coupling an oscilloscope to the link, when both user A and B are transmitting, the observed waveform on the link is the composite of the respective west-to-east waveform being transmitted from user A to user B and the east-to-west waveform being transmitted from user B to user A, so that the two waveforms interfere with each other, making it generally impossible to be able to distinguish the signals transmitted from either of users A and B. Historically, this inability to distinguish between the two signals has involved the coupling of some form of bridge tap device into the link device, as diagrammatically illustrated at 15 in FIG. 3.

Unfortunately, such an installation first requires that the line be cut and that termination devices, such as respective type A and type B modems 21 and 22 diagrammatically illustrated in FIG. 4, be physically installed, thereby disrupting the ongoing communications between users A and B.

Another technique comprises involves an amplitude difference between the two signals Sa and Sb, by installing an attenuator in the link and observing the amplitude of the signal on one side of the attenuator versus the signal level on the other side of the attenuator. Using this signal level information, user A's signal Sa can be separated from user B's signal Sb. Again, however, this scheme requires cutting the line and installing the attenuator. Moreover, insertion of an attenuator imparts an loss that can degrade the communications between users A and B.

A further approach involves sampling the wireline signals at two spaced apart locations along the link in order to establish a phase or amplitude difference between the sampled signals and thereby differentiate between signals Sa and Sb. However, due to the speed of propagation of the electrical signals on the link with respect to the data rate of the digital data, the separation distance between the two different tap points would have to be hundreds of feet, so that such a technique is not a practical solution to the problem.

Advantageously, the above referenced co-pending application Ser. No. 969,788 filed Oct. 29, 1992, entitled "Blind Signal Separation and Equalization of Full-Duplex Amplitude Modulated Signals on a Signal Transmission Line," by M Webster et al, the disclosure of which is herein incorporated, describes a wireline bridge tap device and an associated signal processing mechanism that is capable of successfully extracting and recovering the respective signalling components of a full-duplex wireline digital data link, without having to disturb the link (e.g. temporarily interrupting service by severing a wireline to install a line coupling device, such as a modem or attenuator pad, to signal monitoring equipment).

More particularly, as diagrammatically illustrated in FIG. 5, this 'blind acquisition' full-duplex wireline bridge device and signal processing receiver comprises a pair of complementary electrical characteristic sensing devices, in particular, a voltage probe 23 and a current probe 24. The respective probes are coupled to the wireline communication link 11 in close proximity to each other, so that they effectively 'see' the same (bidirectional) signal.

An attendant signal characteristic monitoring circuit 25 is operative to controllably combine the outputs of the voltage and current probes 23, 24 and provide respective output signals that are representative of the desired unidirectional (east-to-west, west-to-east) signal components Sa and Sb. For this purpose, the signal characteristic monitoring circuit employs a signal processing mechanism which adjusts the characteristic impedance of the interface, so as to compensate for the impedance characteristics of the communication link. It also provides compensation for prescribed performance characteristics of the directional signal separator.

In operation, the blind signal separation and equalization signal processor detects the stronger of the two PAM signals and provides an output corresponding to the difference between the line signal and the contribution of the stronger PAM signal to the line signal. It also provides a weak PAM signal by filtering the distortion out of the difference between the line signal and the contribution of the strong PAM signal on the line signal. Analog and digital processing are used to separate the stronger PAM signal and the weaker PAM signal from the line signal. The stronger PAM signal is ascertained by a filter and signal processing unit 26 estimating the impedance Z experienced by the weaker PAM signal, multiplying, as diagrammatically shown at 27, the line current by an estimated impedance value Kz, in order to estimate the weaker PAM signal, and subtracting the estimated weaker PAM signal from the line signal to provide the stronger PAM signal.

Filter and signal processing unit 26 ascertains which of the signals is the weaker PAM signal by estimating the contribution of the stronger PAM signal on the overall line signal, subtracting the estimate from the overall line signal to provide the weaker PAM signal and filtering line distortion out of the result. A first order approximation of the weaker PAM signal is obtained by either adding or subtracting the current signal to or from the line voltage signal. The hardware employed within filter and signal processing unit includes an analog processing unit having an analog signal conditioner, and a signal deemphasis unit for providing a signal indicative of the difference between the voltage signal from voltage probe 23 and the line current signal from current probe 24 indicative of a first order approximation of the weaker PAM signal. Also included are analog-to-digital (A-D) converters for converting the line voltage signal, the line current signal, and the first order approximation of the weaker PAM signal into digital values for processing by a digitally implemented adaptive filter unit. The output of the adaptive filter unit is coupled with a timing signal or clock recovery phase lock loop, through which the respective modulation clocks employed at each transmitting site are derived, so that demodulation of the information signals may successfully be carried out.

The adaptive filter unit includes a first (z) filter which is coupled to the digital output of the analog conditioning unit indicative of line current and is operative to approximate the impedance encountered by the weaker (omega) PAM signal. A first summation unit is operative to combine a signal indicative of the line voltage and the output of the first filter. A second filter is coupled to the output of the first summer for providing an output corresponding to the stronger (alpha) of the two PAM signals. A third (x) filter is coupled to the output of the second filter for approximating a signal indicative of the contribution of the stronger (alpha) of the PAM signals to the line signal. A subtraction circuit is coupled to receive the first order approximation of the weaker (omega) PAM signal and the output of the third (x) filter for differentially combining the output of the third filter from the first order approximation of the weaker of the PAM signals. A fourth (omega) filter is coupled to the output of the second summer for providing an output representative of the weaker of the PAM signals. Since the signal acquisition processor is coupled to the full-duplex link in a 'blind' manner, while (PAM) communications are taking place, the weights of the filters are initialized and then adapted using typical communication data, without the availability of a training preamble.

Unfortunately, timing signal recovery in a blind acquisition full duplex environment, such as a conventional telephone link, requires the use of a signal processing mechanism that inherently suffers from the introduction of clock jitter from two principal sources: 1) self-induced noise due to spectral filtering; and 2) jitter induced by the adjacent (interfering) signal.

More particularly, as noted above, an effectively 'blind' acquisition and recovery mechanism does not have the benefit of a customarily employed 'training preamble' to adjust distortion compensation parameters. Consequently, decision-directed timing recovery is not available. Thus, a more rudimentary scheme for extracting the principal spectral component (modulation clock) of the monitored signal must be employed.

One such technique, known as a Bubrouski loop, is illustrated in FIG. 6 as comprising a narrowband prefilter 31 and square law detector 32 within the signal flow path to the control arm of a timing recovery phase lock loop. For the full-duplex signal monitoring and separation environment of FIG. 5, bandpass prefilter 31 is coupled to the output of a summer 29 from which the waveform of interest, (in the present example, the combined voltage and estimated impedance (Kz)-weighted current signal supplied by a summer 29), is supplied. Bandpass filter 31 has a (Nyquist) bandwidth of one-half the symbol rate; its output is coupled to square-law detector 32, which generates a spectral component representative of the clock frequency embedded in the monitored waveform. This spectral component is used to control a clock generator within a narrowband phase lock loop 33.

Because of interference between sources Sa and Sb, the signals on the monitored link 11 inherently suffer from a poor signal-to-self noise ratio, and without the presence of narrowband prefilter 31, square-law detector 32 would introduce a substantial squaring penalty. Unfortunately, the characteristic of a bandpass filter is not exactly symmetric about its center frequency; typically the upper end of its frequency response rolls off more sharply than its lower end, so that it has conjugate antisymmetry, which causes phase-noise (clock jitter) to be introduced by the squaring operation performed by square law detector 32. Although this phase noise can be substantially rejected if the bandwidth of the loop filter is relatively narrow, such a bandwidth limitation may prevent the receiver from adequately tracking the monitored signal and a loss in bit error rate (BER) may be incurred.

Reduction of timing jitter induced by the adjacent interfering signal may be realized by adaptively adjusting the impedance constant Kz by which the monitored current signal component is scaled and combining (summing) the weighted current component with the voltage component, so as to cancel the interference. FIG. 7 diagrammatically illustrates how this may be accomplished in the course of employing the Brubowski loop of FIG. 6 for clock recovery in the signal processing mechanism described in the above-referenced co-pending '728 application. The weighting constant Kz a (complex scalar) is controllably adjusted a weighting constant generator 60, which employs a least mean square (LMS) operator to update the value of Kz in accordance with the envelope of the noise in the combined signal output by summer 29.

For this purpose, the output of pre-filter 31 is downconverted by a dual channel (I/Q) mixer 34 into inphase (I) and quadrature (Q) components, which are coupled to respective square law detectors 32I and 32Q. The square law detector outputs are summed in an adder 35 and applied to weighting constant generator 40. Respective sine (I) and cosine (Q) inputs of mixer 34 are driven by a numerically controlled oscillator 36, which is controlled by the Q arm of the loop through a loop filter 37. When phase lock is achieved, the voltage on the Q arm goes to zero volts, and the I arm is at D.C., or in-phase with the acquired clock. A blocking capacitor 38 is inserted in the I arm, so that both inputs to adder 35 will be zero, when phase lock is achieved, causing its output ($I^2+Q^2$), which represents the envelope of the noise, to be zero whereby scaling constant Kz will be properly set.

Unfortunately, a potential problem with the use of a conventional Bubrouski loop for timing signal recovery is its slow rate of convergence and its inability to distinguish between the above described self-noise jitter and interference-induced jitter, which can at least be achieved by a narrow loop bandwidth approach.

SUMMARY OF THE INVENTION

In accordance with the present invention the presence of timing jitter present in the clock recovery loop of a 'blind' signal acquisition receiver employing a square law detector in the phase lock loop signal flow path can be successfully effectively removed by adaptively adjusting the parameters of the loop's prefilter to compensate for conjugate antisymmetric components in the spectrum of the monitored signal of interest. In particular, the new and improved signal timing recovery signal processing mechanism of the present employs a lowpass or baseband filter as the prefilter, which is not inherently conjugate antisymmetric as is a passband filter, and includes a filter parameter adjustment operator, which controllably sets the parameters of the baseband prefilter so that the prefilter transfer function seen by the squaring operation is essentially conjugate symmetric.

As in the case of the adaptive filtering and signal processing mechanism employed in the system described in the above-referenced co-pending '788 application, the clock recovery circuit of the present invention is preferably digitally implemented using conventional digital signal processing components. Although an exemplary signal processing environment in which the present invention may be employed is a full duplex environment, such as a two wire line telephone link referenced above, the operative mechanism of the present invention is directly applicable to timing recovery for a single signal application.

More particularly, for a single input signal, the input signal is sampled and digitized by means of an analog-to-digital converter. The sampling clock for the A-D converter is controlled by the output of the loop filter of a phase lock loop. The phase lock loop is preferably a second order loop, in order to effectively excise static phase errors, which undesirably introduce bias into the prefilter parameter adjustment. The phase lock loop's phase detector is coupled to the output of a squaring circuit (square law detector) to which the output of adjustable prefilter is applied. The output of the square law detector is representative of the spectral component in the filtered signal, namely, the embedded clock signal of interest.

Unlike a conventional Bubrouski loop having a conjugate antisymmetric bandpass filter as the prefilter, which inherently distorts the signal, the adjustable prefilter of the signal processing mechanism of the present invention is a lowpass (baseband) filter, whose transfer function is effectively conjugate symmetric. The transfer function of the prefilter is centered at 0 Hz, so that the digitized output of the A-D converter must first be down-converted to baseband.

The timing jitter compensation technique of the present invention uses knowledge of the effect of the square law circuit on the prefiltered signal. A BPSK-type 'signal, for example, has positive and negative vector components, as does a typical telephone link PAM signal. Absent static error, the output of the square law detector on such a signal is a positive vector. If a BPSK-type signal further contains AM modulation (similar to the different amplitude values ($+1$, $+3$) and ($-1$, $-3$) of telephone link modulation format), the output vector also will contain the AM modulation component, which is amplified because of the squaring operation. However, the output vector contains no phase jitter or imaginary component), since unwanted phase modulation or clock jitter manifests itself at the output of the squaring circuit only if, prior to squaring, the signal contains an imaginary component.

In accordance with the present invention, an imaginary component in the prefiltered signal is employed as an error signal to adjust the parameters of the prefilter in order to drive the imaginary component to zero. Namely, the prefiltered input to the square law detector is processed with the knowledge of what the square law detector does to its input signal, so that the weights of the prefilter will be (linearly) adapted to eliminate any imaginary component it may contain, prior to squaring.

The prefilter is effectively implemented as a phase jitter directed filter equivalent comprising a high decimation filter stage connected in cascade with a finite impulse response (FIR) filter stage. The weights of the FIR filter stage are adjusted by an LMS-based filter parameter adjustment operator. The high decimation filter stage is operative to perform a decimation of the number of samples per unit time output by the A-D converter to a reduced sample rate, so as to lessen computational intensity in the generation of the filter function. The FIR filter stage is digitally implemented as a multitap filter initial normalized tap settings for which define a low pass filter; tap weights are adjusted by the LMS-based filter parameter adjustment operator.

A comparison of respective outputs of square law detector for signal samples processed through the prefilter prior to and after adaptation of its weights by an LMS error mechanism employed by filter parameter adjustment operator reveals a substantial improvement in phase jitter. It has been observed that the filter's tap weights do not deviate substantially from preset values. Since the prefilter is required to compensate for conjugate antisymmetry in the received spectrum, the frequency response of the filter is not perfectly symmetrical, but contains a slight skew that is effectively complementary to the conjugate antisymmetry.

The clock recovery loop of the present invention may be employed to process two signals, such as extracted current and voltage signal components output by the above-referenced co-pending application. The voltage and current waveform components are processed in parallel. The filtered signals are then combined to produce a composite signal which is squared. The filter parameter adjustment operator adaptively updates the filter weights of each signal processing path in accordance with the phase error component of the combined signal.

DETAILED DESCRIPTION

Figure 1:
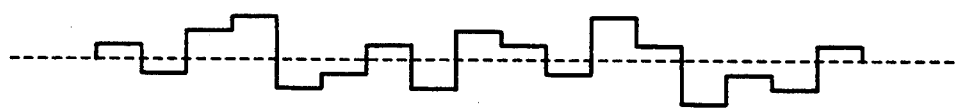
FIG. 1 shows the format of a pulse amplitude modulated (PAM) signal as may be conveyed over full duplex (telephone) link.
Figure 2:
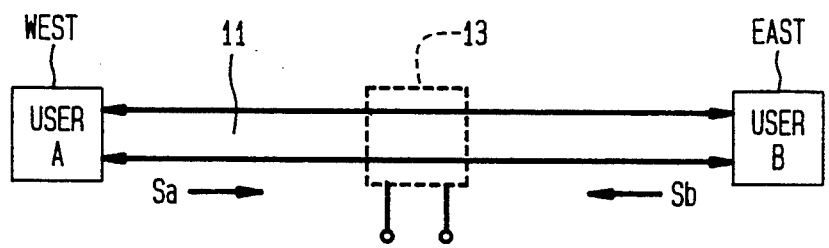
FIG. 2 diagrammatically illustrates an 'east-west' full duplex communication system.
Figure 3:
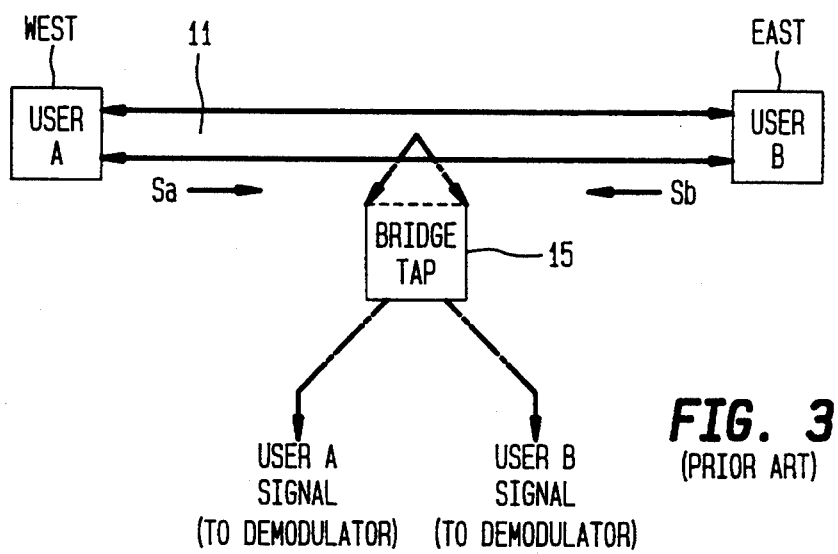
FIG. 3 diagrammatically illustrates the coupling of a bridge tap device to a communication link.
Figure 4:
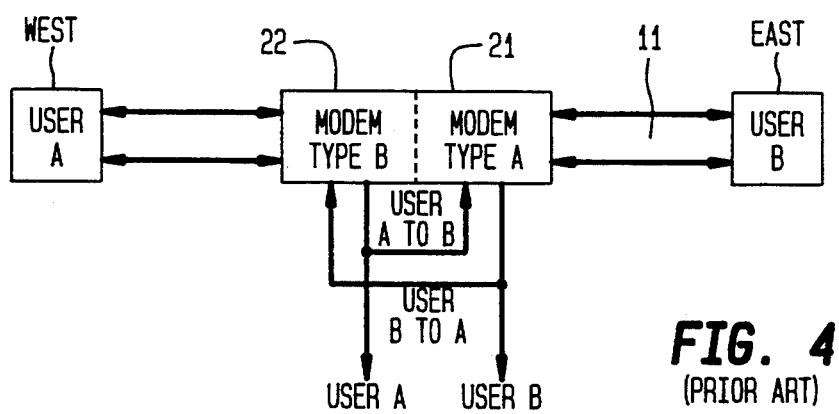
FIG. 4 diagrammatically illustrates the installation of respective different types of modems in a communication link.
Figure 5:
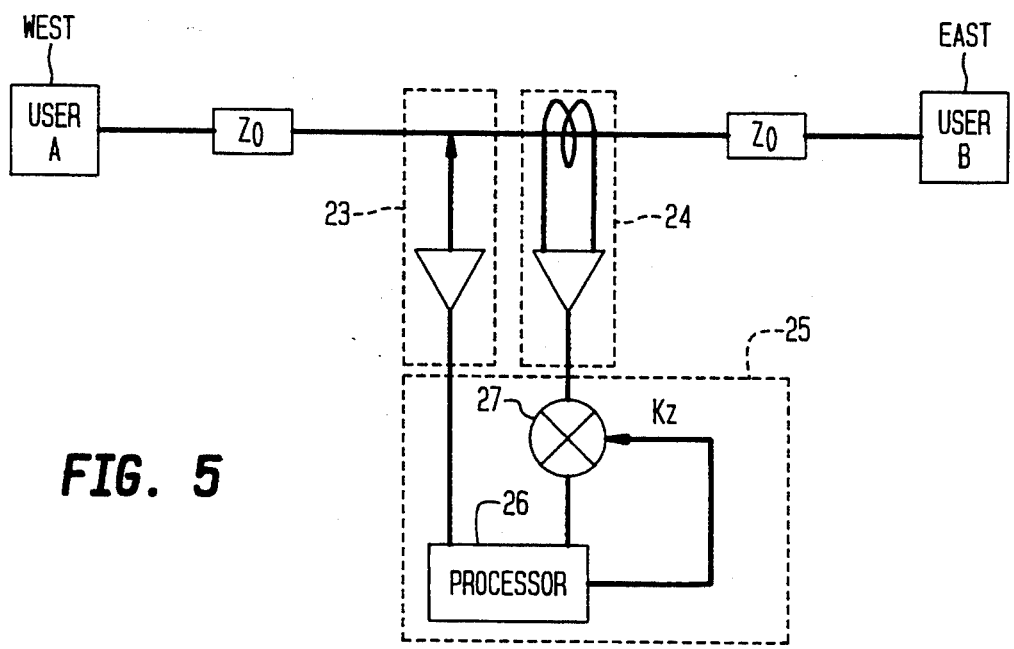
FIG. 5 diagrammatically illustrates the manner in which a blind acquisition full-duplex wireline bridge device and signal processing receiver adjusts the characteristic impedance of the wireline interface, so as to compensate for the impedance characteristics of the communication link.
Figure 6:
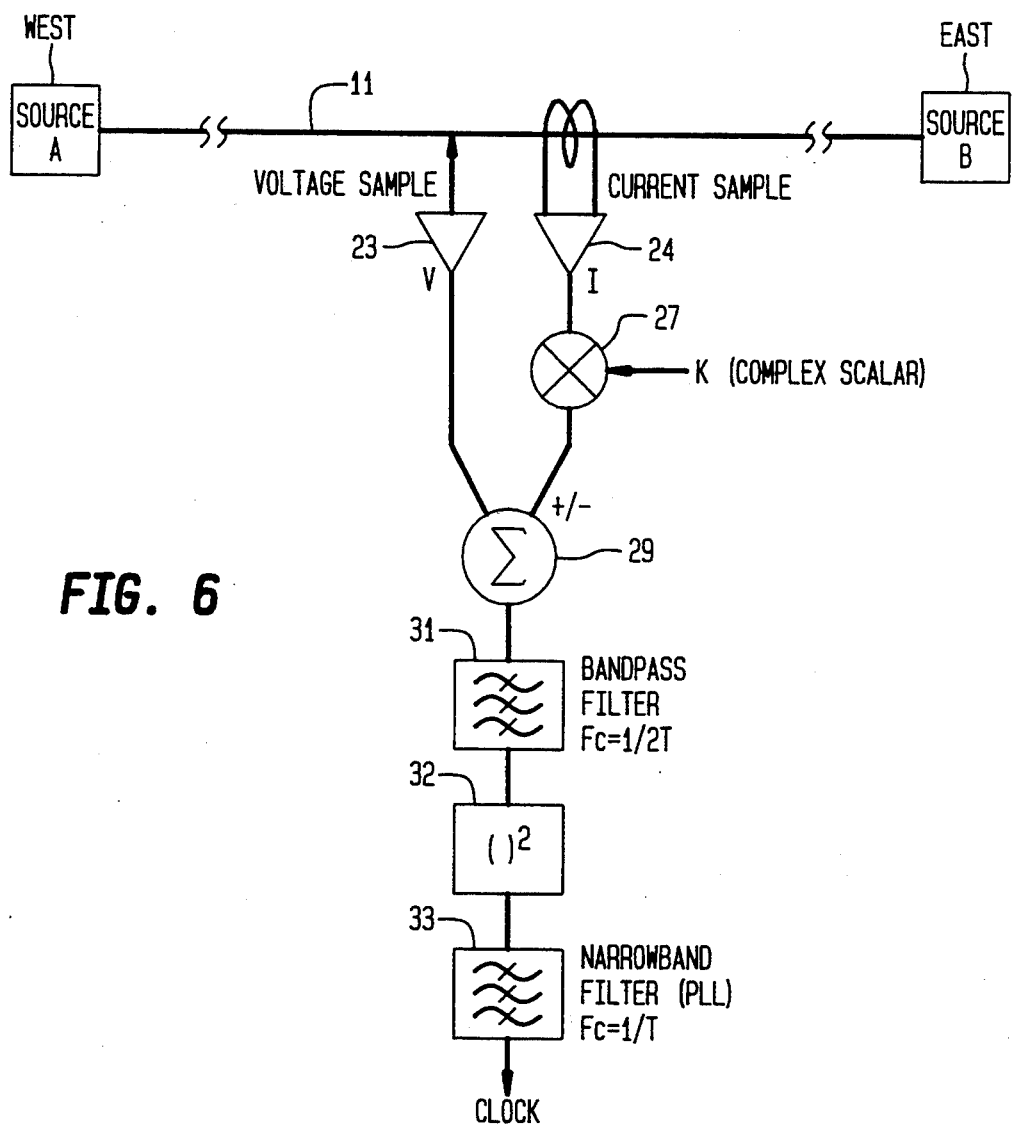
FIG. 6 diagrammatically illustrates interference canceling circuitry and a Bubrouski loop.
Figure 7:
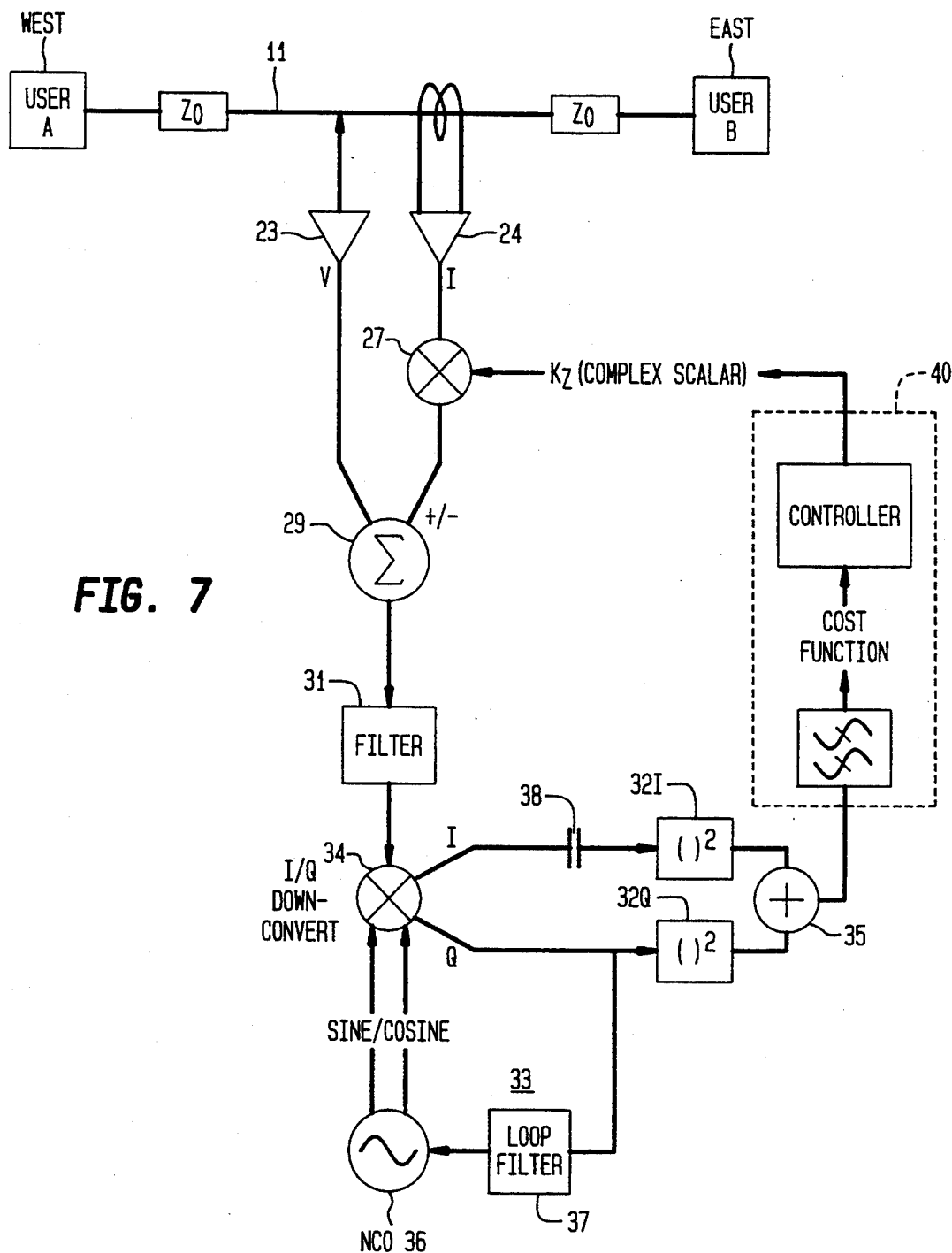
FIG. 7 diagrammatically illustrates an adaptive mechanism for reducing timing jitter due to intersignal interference by adaptively weighting the current component extracted by the signal processing mechanism described in the above-referenced co-pending application using the Bubrouski loop of FIG. 6.

Before describing in detail the particular improved timing jitter reduction mechanism in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary scheme, but are primarily intended to illustrate the major structural components of a signal processing network in a convenient functional grouping, whereby the present invention may be more readily understood.

Figure 8:
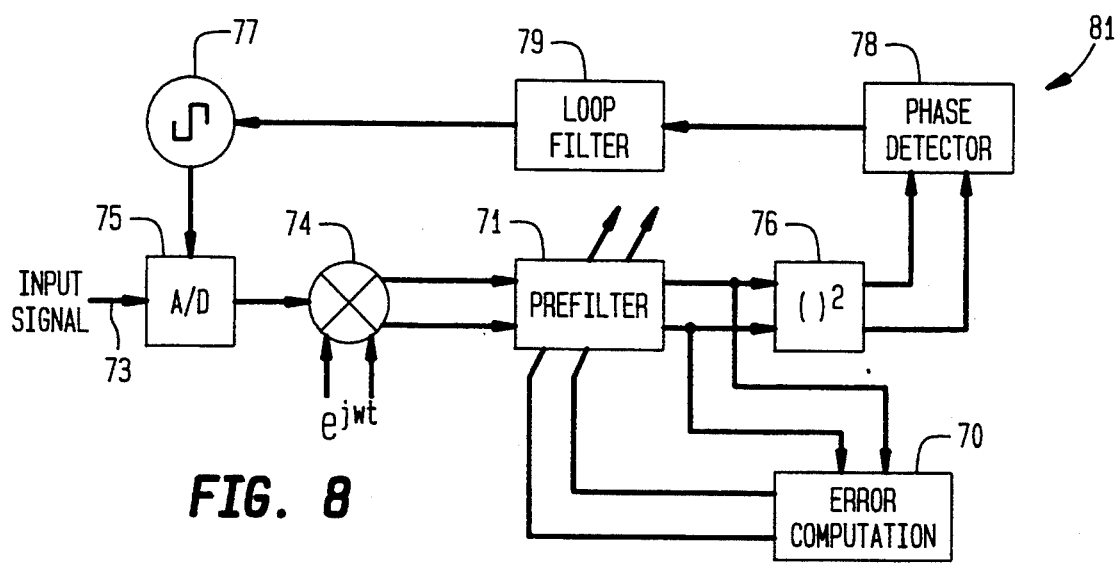
FIG. 8 is a functional block diagram of a clock recovery loop in accordance with a first embodiment of the invention which is operative to adaptively adjust the parameters of the loop's prefilter reduce timing jitter for the case of a single input signal.

FIG. 8 is a functional block diagram of a clock recovery loop in accordance with a first embodiment of the invention which is operative to adaptively adjust the parameters of the loop's prefilter reduce timing jitter for the case of a single input signal. In this and subsequent Figures, double signal flow lines are used to represent both the read and the imaginary components of the signal. The processing of multiple signal components (e.g. the current and voltage signal components extracted in the system described in the above-referenced co-pending application) is a straight-forward extension of the single signal case and will be described below with reference to FIGS. 19–21.

To facilitate an understanding of the operative mechanism employed in accordance with the present invention, the source of phase (clock) jitter will be presumed to be exclusively caused by conjugate antisymmetric components in the spectrum of the input signal of interest; namely, phase noise due to an interfering signal will be initially ignored. As will be described, the signal processing mechanism of FIG. 8 includes a filter parameter adjustment (error computation) operator 70 which controllably sets the parameters of a prefilter 71, so that the filtered signal does not possess conjugate antisymmetry about the Nyquist frequency and the spectrum of the filtered signal is exactly conjugate symmetric.

Figure 9:
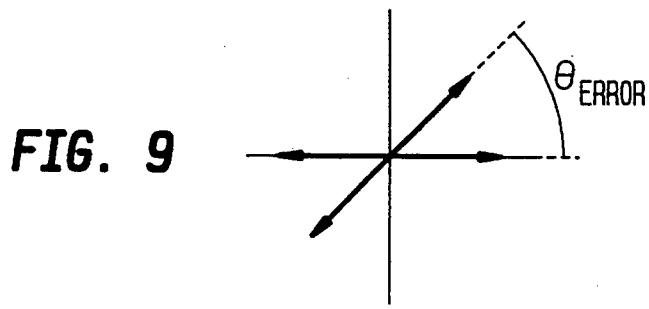
FIG. 9 shows static phase errors as vector jitter.

The overall configuration of the clock recovery circuit of FIG. 8 which, as described above, is preferably digitally implemented using conventional digital signal processing (DSP) components, includes an input port 73 to which the signal of interest is applied. The input signal is sampled and digitized by means of an analog-to-digital (A-D) converter 75 to some prescribed encoding resolution. The sampling clock for A-D converter 75 is derived by means of a (numerically) controlled clock generator 77, which is controlled by the output of the loop filter 79 of a phase lock loop 81. Phase lock loop 81 is preferably a second order loop, in order to effectively excise static phase errors of the type shown in FIG. 9 as vector jitter. Such static phase errors are typically inherent in a first order loop when there is a normalized frequency offset between the clock signal embedded in the input signal and the reference clock employed by controlled oscillator 77. Static phase error is undesirable since it introduces bias into the prefilter parameter adjustment carried out by 70 filter parameter adjustment operator 70. Although static phase error could be effectively obviated by employing a large loop gain or large loop bandwidth, the result would be operational instability.

Phase lock loop 81 includes a phase detector 78, which is coupled to the output of a square law detector 76, to which the output of adjustable prefilter 71. As in a conventional Bubrouski loop, described above, the output of square law detector 76 is representative of the spectral component in the filtered signal, namely, the embedded clock signal of interest. Unlike a conventional Bubrouski loop, which employs a (conjugate antisymmetric) bandpass filter as the prefilter, and thereby inherently distorts the signal, the adjustable prefilter 71 of the signal processing mechanism of FIG. 8 is a lowpass or baseband filter, whose transfer function is exactly conjugate symmetric. Because the transfer function of prefilter 71 is centered at 0 Hz, the digitized output of A-D converter 75 is coupled to mixer 74, which down-converts the sampled signal to baseband.

Figure 10:
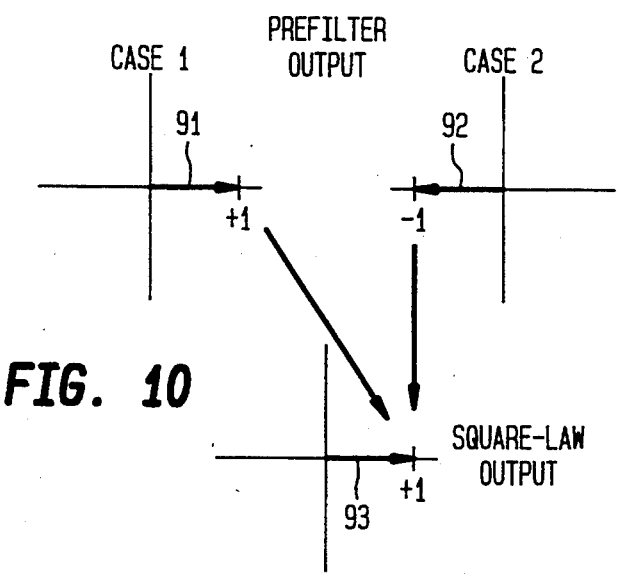
FIG. 10 diagrammatically illustrates the effect of a squaring circuit on a BPSK-type signal.

FIG. 10 diagrammatically illustrates the effect of square law detector 76 on a BPSK-type signal, shown as having positive and negative (unity) vector components 91, 92, respectively. Absent static error, the result is a positive (unity) vector 93. If the BPSK further contains AM modulation, the output vector also will contain the AM modulation component (amplified because of the squaring operation). What is significant is the fact that the output vector contains no phase jitter (imaginary component). Namely, unwanted phase modulation (clock jitter) will manifest itself at the output of square law detector 76 only if, prior to squaring, the signal contains an imaginary (y-axis) component.

In accordance with the invention, the presence of an imaginary component (deviation off the real or x-axis) in the prefiltered signal is used as an error signal to adjust the parameters of the prefilter so as to drive the imaginary component to zero. Namely, the prefiltered input to the square law detector is processed with the knowledge of what the square law detector does to its input signal, so as to linearly adapt the prefilter to eliminate any imaginary component it may contain, prior to squaring.

Figure 11:
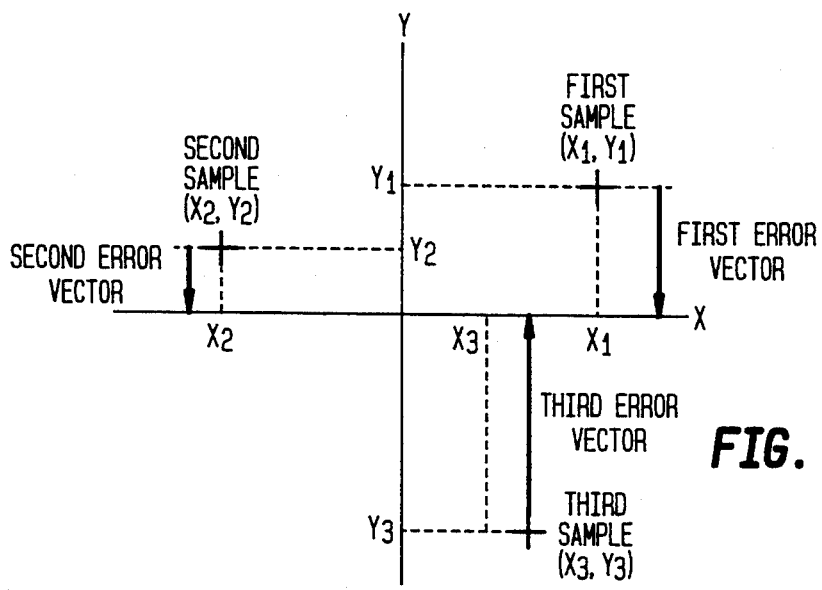
FIG. 11 illustrates error computations associated with three signal vectors.

Error computations associated with three signal vectors are illustrated in FIG. 11, at respective complex plane locations $(X_1, y_1)$, $(X_2, y_2)$ and $(x_3, y_3)$. The difference is vector lengths is due to AM noise. Although each error is actually a two-dimensional vector, the error computation required to adjust weights of the prefilter is relatively straightforward and very accurate, since the error is simply the value of the y-axis or imaginary component of the vector. A preferred implementation of the prefilter and the operator through which the weights of the prefilter are adjusted in accordance with the imaginary components of the sample vectors are described in detail below.

Figure 12:
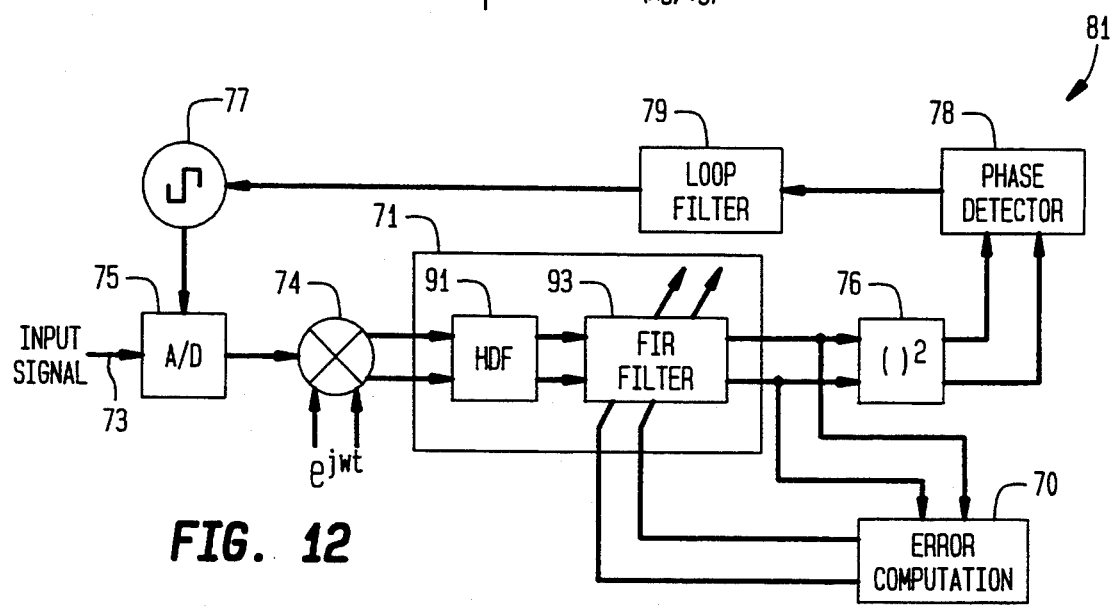
FIG. 12 diagrammatically illustrates a preferred embodiment of the present invention.

In accordance with a preferred embodiment of the invention, diagrammatically illustrated in FIG. 12, prefilter 71 is implemented as a phase jitter directed filter comprising an upstream high decimation filter stage 91 which is connected in cascade with a finite impulse response (FIR) filter stage 93, the weights of which are adjusted by filter parameter adjustment operator 70. High decimation filter stage 91 is operative to perform a decimation of the number of samples per unit time output by A-D converter 75 (e.g. 160K samples/sec.) to a lower sample rate (e.g. 1K samples/sec.), so as to reduce computational intensity in the generation of the filter function. As a non-limitative example, high decimation filter stage 91 may comprise an HSP43220 decimating digital filter chip, manufactured by Harris Corp., Melbourne, Fla. FIR stage 93 is preferably implemented as a multitap filter, having an odd number (e.g. 29) of complex weights symmetrically distributed about its center tap.

FIR filter stage 93 is initialized with a symmetric set of weights. All of the weights of FIR filter stage 93, except its center weight, are adapted. This constraint forces the phase detector 78 and loop filter 79 to remove static phase error, as in a conventional phase locked loop. FIR filter stage 93 is adapted to remove phase jitter (phase noise) only, not static phase errors.

Figure 14:
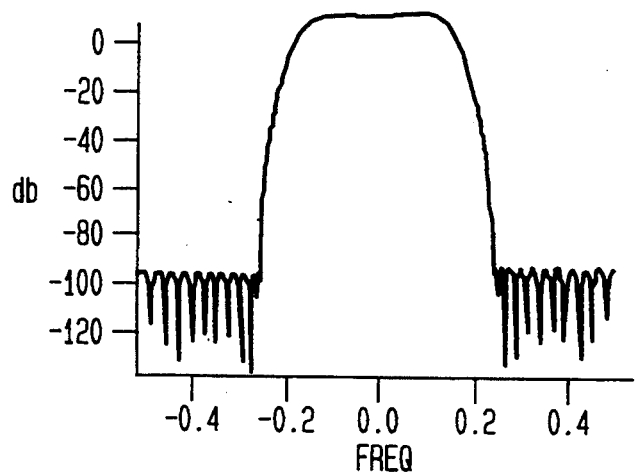
FIG. 14 illustrates the frequency response for an FIR filter stage normalized to 1 KHz.

The weights of FIR filter stage 93 are iteratively adjusted by operator 70 to minimize the imaginary component in the signal, as described above. For this purpose (error computation) operator 70 is preferably implemented as a digital signal processing operator which contains a conventional least mean squared (LMS) algorithm that drives the imaginary component (unwanted phase jitter) to zero. The frequency response for filter 93 normalized to 1 KHz (from −500 Hz to +500 Hz) is illustrated in FIG. 14. The frequency scale is demarcated in 0.2 increments of the 1 KHz range.

Figure 13:
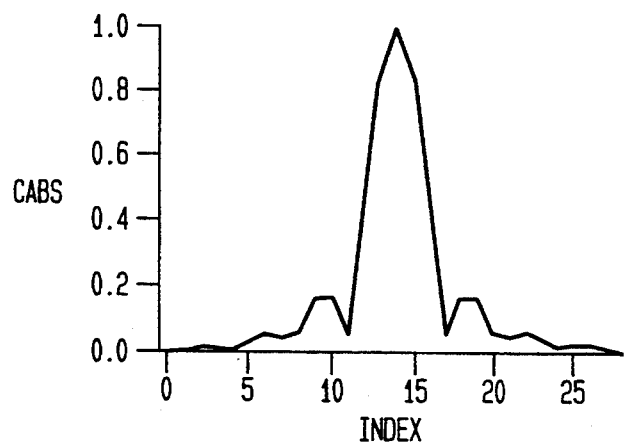
FIG. 13 shows initial normalized tap settings for an FIR filter stage.
Figure 15:
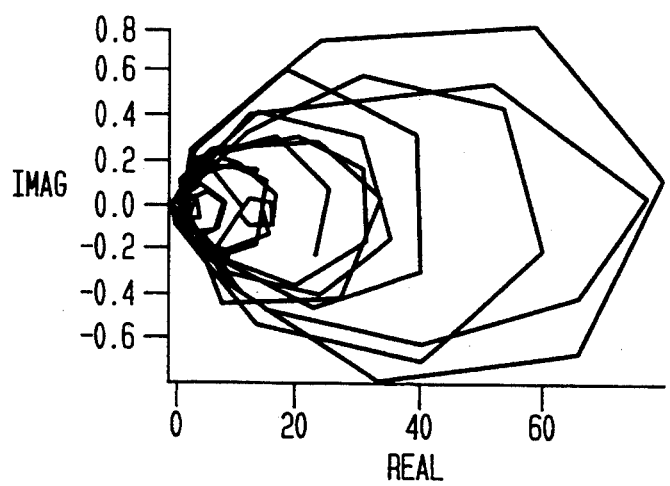
FIG. 15 is a plot of the result of the operation of the square law detector of FIG. 12 on successive data samples processed through the prefilter having initialized characteristics of FIGS. 13 and 14 prior to adaptation of the filter weights.

FIG. 15 is a plot of the result of the operation of square law detector 76 on successive data samples processed through filter 91 having the initialized characteristic of FIGS. 12 and 13 prior to adaptation of the filter weights by filter parameter adjustment operator 70. Variations along the real or x-axis correspond to amplitude modulation of the signal, while variations along the imaginary or y-axis correspond to phase modulation (timing jitter) of the signal. In the example shown the average phase jitter is equal to 0.01 of a symbol period. The signal bandwidth at the squaring output is approximately 200 Hz, or twice the passband of the squaring input.

Figure 16:
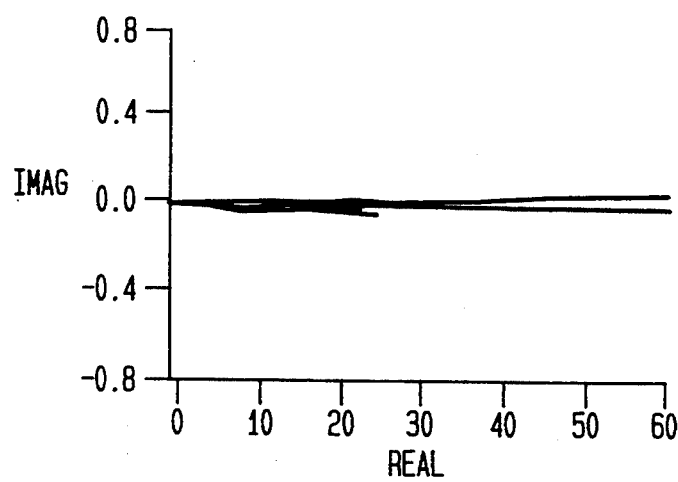
FIG. 16 is a plot of the result of the operation of the square law detector of FIG. 12 on successive data samples processed through the prefilter having after adaptation of the filter weights by the least mean square error mechanism employed by filter parameter adjustment operator.

FIG. 16 is a plot of the result of the operation of square law detector 76 on successive data samples processed through filter 91 having the initialized characteristic of FIGS. 12 and 13 after adaptation of the filter weights by the least mean square error mechanism employed by filter parameter adjustment operator 70. It can be seen that a very substantial improvement in phase jitter has occurred.

Figure 17:
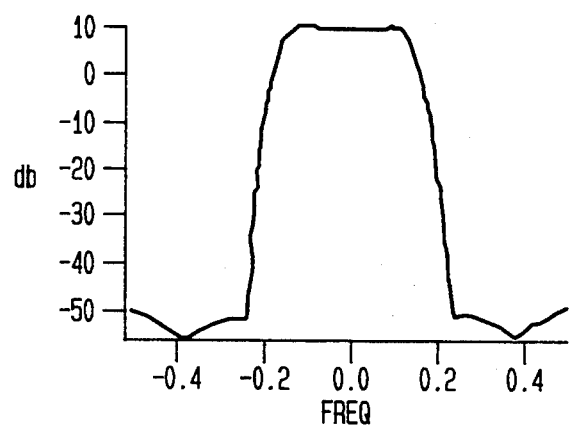
FIG. 17 shows the frequency response of the prefilter whose filter weights have been adapted by operator.
Figure 18:
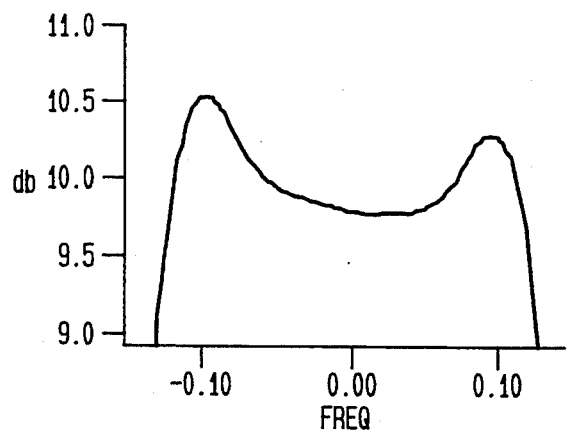
FIG. 18 illustrates an enlargement of the prefilter's frequency response containing a skew that is effectively complementary to conjugate antisymmetry in the received signal spectrum.

FIG. 17 shows the frequency response of filter 91 whose filter weights have been adapted by operator 70. From a comparison of FIGS. 13 and 16 it can be seen that the tap weights do not deviate substantially from their preset values. Since the filter is required to compensate for the conjugate antisymmetry in the received spectrum, the frequency response of the filter will not be perfectly symmetrical, but will contain a slight skew that is effectively complementary to this conjugate antisymmetry, as shown by the enlargement of the filter's frequency response in FIG. 18.

Figure 19:
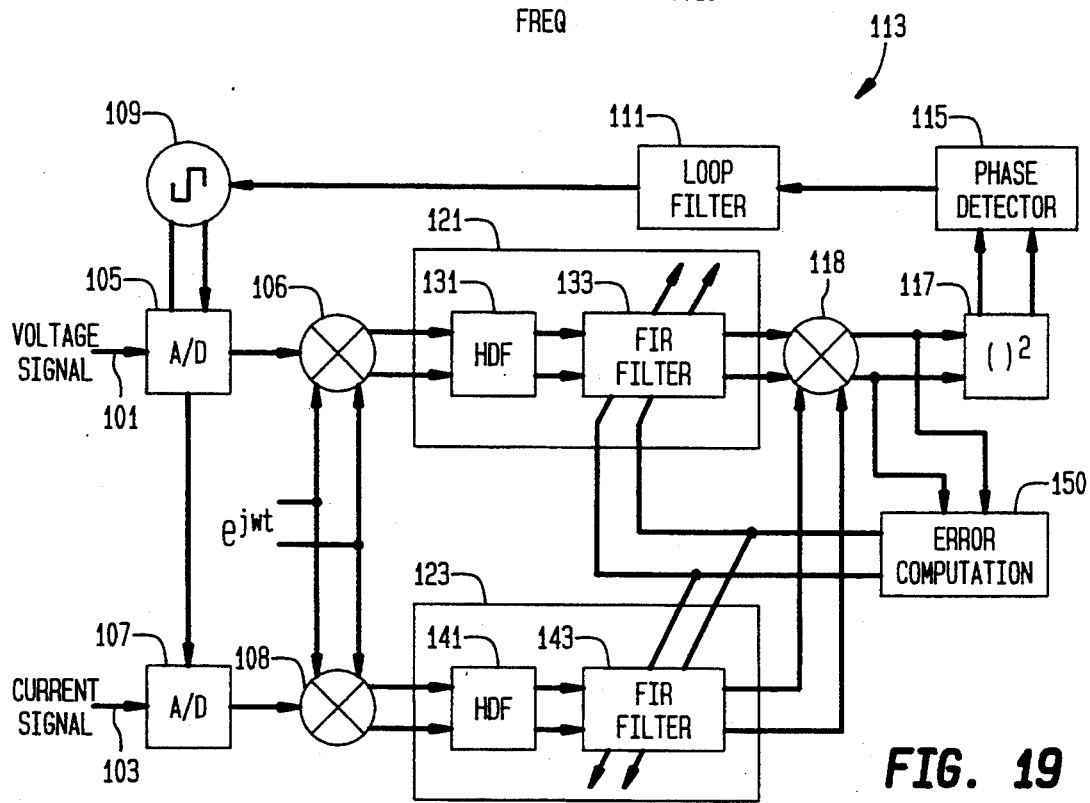
FIG. 19 is a functional block diagram showing the manner in which the clock recovery loop of FIG. 8 may be modified in accordance with a second embodiment of the present invention to process a pair of voltage and current representative signals.

As described previously, one clock recovery application where the present invention has particular utility is the wireline bridge tap device and associated signal processing mechanism described in the above-referenced co-pending '788 application. FIG. 19 is a functional block diagram showing the manner in which the clock recovery loop of FIG. 8 may be modified in accordance with a second embodiment of the present invention to process two such signals. As pointed out above, the processing of multiple signal components (e.g. extracted current and voltage signal components output by the above-referenced co-pending application) is a straight-forward extension of the single signal case described with reference to FIGS. 8-18.

The voltage and current waveforms are processed (digitized, down-converted and prefiltered) in parallel. The filtered signals are combined to produce a composite signal which is squared. The filter parameter adjustment operator adaptively updates the filter weights of each signal processing path in accordance with the phase error component of the combined signal.

More particularly, the clock recovery circuit of FIG. 19 includes a first input port 101 to which the extracted voltage component of the full duplex signal of interest is applied, and a second input port 103 to which the extracted current component is applied. The voltage signal is sampled and digitized by means of a first A-D converter 105 and the current signal is sampled and digitized by means of a second A-D converter 107. The sampling clock for each A-D converter is derived by means of a numerically controlled clock generator 109, which is controlled by the output of the loop filter 111 of a (second order) phase lock loop 113.

Phase lock loop 113 includes a phase detector 115, which is coupled to the output of a square law detector 117, to which the combined outputs of respective adjustable prefilters 121 and 123 are applied. The transfer functions of prefilters 121, 123 are centered at 0 Hz, so that the digitized outputs of A-D converter 105, 107 are coupled to respective mixers 106, 108, which down-convert the sampled signals to baseband.

The output of square law detector 117 represents the spectral component (the embedded clock) in the combined (via adder 118) prefiltered voltage and current representative waveforms. As in the single signal case, each of adjustable prefilters 121, 123 is implemented as a phase jitter directed filter. Voltage signal path prefilter 121 comprises a high decimation filter stage 131 which is connected in cascade with an FIR filter stage 133. As with the case of FIR filter stage 93, described above, FIR filter stage 133 is initialized with a symmetric set of weights. All of the weights of FIR filter stage 133, except for the center weight, are adapted This constraint forces the phase detector 115 and loop filter 111 to remove static phase error, as in a conventional phase locked loop. FIR filter stage 133 is adapted to remove phase jitter (phase noise) only, not static phase errors. Again, an LMS adaptation algorithm is used.

Current signal path prefilter 123 comprises a high decimation filter stage 141 which is connected in cascade with FIR filter stage 143. The current signal's FIR filter stage 143 is initialized with the same wet of weights as the voltage signal's FIR filter stage 133. All of the weights are adapted for FIR stage 143, in contrast to FIR stage 133, which does not have its center weight adapted, as described above. However, for filter stage 143, a conventional leaky LMS algorithm is used, instead of the LMS algorithm. The leaky LMS algorithm prevents the current's FIR filter stage 143 from interacting with the phase detector 115 and the loop filter 111 in an unstable manner. The phase detector 115 and the loop filter 111 are forced to remove static phase errors. FIR filter stage 143 is used to remove only phase jitter caused by two-signal interference.

Figure 20:
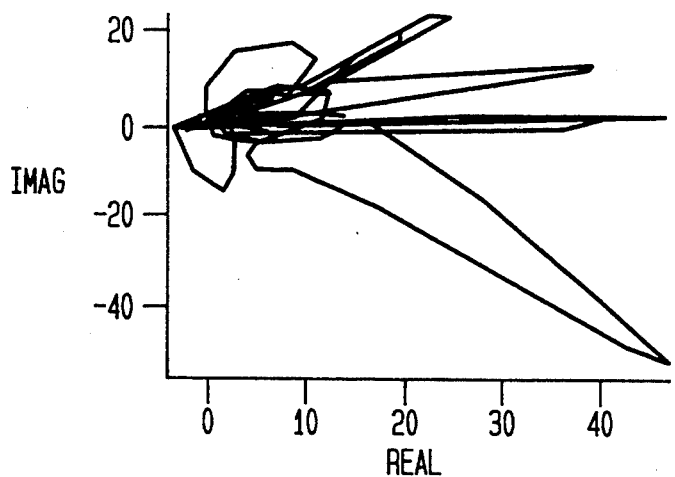
FIG. 20 is a plot of the result of the operation of the square law detector of FIG. 19 on successive composite voltage and current representative data samples of equal strength and a one-quarter symbol period delay between first and second signals that have been prefiltered through respective filters prior to adaptation of the filter weights.

FIG. 20 is a plot of the result of the operation of square law detector 117 on successive composite voltage and current representative data samples of equal strength and a one-quarter symbol period delay between them, that have been prefiltered through respective filters 121, 123 prior to adaptation of the filter weights by filter parameter adjustment operator 150. Variations along the real or x-axis correspond to amplitude modulation of the signal, while variations along the imaginary or y-axis correspond to phase modulation (timing jitter) of the signal. In the example shown the signal is quite noisy with the average phase jitter being equal to 0.5 of a symbol period.

Figure 21:
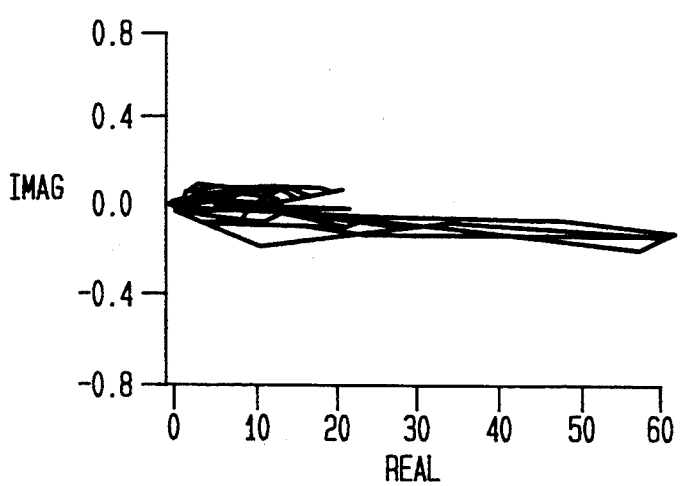
FIG. 21 shows a plot of the effect of the square law detector of FIG. 19 on composite signals processed through the prefilters whose filter weights have been adapted by the least mean square error mechanism employed by the filter parameter adjustment operator.

FIG. 21 shows a plot of the effect of square law detector 150 on composite signals processed through filters 121 and 123 whose filter weights have been adapted by the least mean square error mechanism employed by filter parameter adjustment operator 150. It can be seen that there is a very substantial improvement in squaring output phase jitter, which is equal to only 0.02 of a symbol period.

As will be appreciated from the foregoing description, the amount of timing jitter present in the clock recovery loop of a 'blind' signal acquisition receiver employing a square law detector in the phase lock loop signal flow path is substantially reduced in accordance with the present invention by adaptively adjusting the parameters of the loop's pre-filter so as to compensate for conjugate antisymmetric components in the spectrum of the monitored signal of interest. The signal timing recovery signal processing mechanism of the present includes a filter parameter adjustment operator which controllably sets the weighting parameters of a prefilter, so that the filtered signal does not possess conjugate antisymmetry about the Nyquist frequency and the spectrum of the filtered signal is essentially conjugate symmetric.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of recovering a clock signal from a modulated signal subject to noise contamination comprising the steps of:
   (a) down-converting said modulated signal to baseband so as to obtain a baseband modulated signal;
   (b) filtering said baseband modulated signal by means of an adjustable lowpass finite impulse response filter to provide a filtered baseband signal;
   (c) modifying the transfer characteristic of said adjustable lowpass finite impulse response filter in accordance with error in said filtered baseband signal;
   (d) processing said filtered baseband signal at the output of said adjustable lowpass finite impulse response filter to generate a signal waveform representative of an envelope of noise contamination of said filtered baseband signal; and
   (e) controlling a clock recovery phase lock loop to which said modulated signal is applied in accordance with said signal waveform representative of an envelope of noise contamination of said filtered baseband signal.

2. A method of recovering a clock signal component of a pulse amplitude modulated input signal that is subject to phase and amplitude jitter, comprising the steps of:
   (a) generating a sampling clock signal;
   (b) sampling said pulse amplitude modulated signal in accordance with the sampling clock generated in step (a), so as to provide a sampled input signal;
   (c) down-converting said sampled input signal to baseband, so as to obtain a baseband sampled input signal;
   (d) applying said baseband input signal to a lowpass finite impulse response filter having a transfer characteristic which is effectively complementary to conjugate antisymmetry in the spectrum of said baseband sampled input signal, so as to provide a filtered baseband signal;
   (e) monitoring phase error in said filtered baseband signal and modifying the transfer characteristic of said adjustable lowpass finite impulse response filter so as to reduce said monitored phase error;
   (f) performing a frequency doubling of symbol data energy in the vicinity of half the frequency of said clock signal component of said filtered baseband signal at the output of said adjustable lowpass finite impulse response filter, so as to generate a spectral waveform representative of said clock signal component of said pulse amplitude modulated input signal; and
   (g) coupling the spectral waveform generated in step (f) to a sampling clock phase lock loop so as to control the generation of said sampling clock in step (a).

3. A method according to claim 2, wherein said adjustable lowpass finite impulse response filter has a plurality of complex valued tap weights, and wherein step (e) comprises monitoring phase error in said filtered baseband signal, and adjusting said complex valued tap weights of said lowpass finite impulse response filter, so as to reduce the least mean square value of said monitored phase error.

4. For use with a method of monitoring and extracting respective unidirectional pulse amplitude modulated signal components transmitted on a full duplex wireline communications link, wherein a directional signal separator, which extracts voltage and current signals representative of said unidirectional signal components, is coupled to said link without interrupting the link, so that it provides output signals as voltage and current waveform representative signals, a method of recovering a clock signal component of said pulse amplitude modulated input signals comprising the steps of:
   (a) generating a sampling clock signal;
   (b) sampling said voltage and current representative signals in accordance with the sampling clock generated in step (a), so as to provide respective sampled voltage and current representative sampled signals;
   (c) down-converting said sampled signals to baseband, so as to obtain a baseband voltage and current representative sampled signals;
   (d) applying said baseband voltage and current representative sampled signals to respective first and second lowpass finite impulse response filters having transfer characteristics which are effectively complementary to conjugate antisymmetry in the spectrum of said baseband sampled signals, so as to provide filtered baseband signals;
   (e) combining said filtered baseband signals and monitoring phase error in the resultant combined filtered baseband signals;
   (f) modifying the transfer characteristics of said adjustable lowpass finite impulse response filters so as to reduce said monitored phase error;
   (g) performing a frequency doubling of symbol data energy in the vicinity of half the frequency of said clock signal component of said combined filtered baseband signal at the output of said adjustable lowpass finite impulse response filter, so as to generate a spectral waveform representative of said clock signal component of said pulse amplitude modulated input signals; and
   (h) coupling the spectral waveform generated in step (g) to a sampling clock phase lock loop so as to control the generation of said sampling clock in step (a).

5. A method according to claim 4, wherein each of said adjustable lowpass finite impulse response filters has a plurality of complex valued tap weights, and wherein step (f) comprises adjusting said complex valued tap weights of said lowpass finite impulse response filters as a function of the least mean square value of said monitored phase error.

6. A method of reducing timing jitter in a clock recovery phase lock loop of a signal receiver, said clock recovery phase lock loop including a finite impulse response filter coupled in cascade with a signal squaring circuit, the output of which is operative to control a timing recovery loop clock generator, comprising the steps of:
   (a) monitoring the output of said finite impulse response filter for the presence of a signal component that effectively causes conjugate antisymmetry in the spectrum of the monitored signal of interest; and
   (b) in response to the output of said finite impulse response filter containing a signal component that effectively causes conjugate antisymmetric components in the spectrum of signals output by said filter, adjusting the filter response characteristic of said finite impulse response filter so as to cause the spectrum of signals produced by said finite impulse response filter and coupled to said squaring circuit to have conjugate symmetry.

7. A method according to claim 6, wherein said finite impulse response filter is a lowpass finite impulse response filter.

8. A method according to claim 7, wherein step (b) comprises controllably adjusting parameters of the response characteristic filter of said filter so that the filter transfer function seen by the squaring circuit is effectively conjugate symmetric.

9. A method according to claim 8, wherein said signal of interest is sampled and digitized by an analog-to-digital converter, a sampling clock for said analog-to-digital converter being controlled by said timing recovery loop clock generator, and wherein said clock recovery phase lock loop is a second order phase lock loop.

10. A method according to claim 6, wherein step (b) comprises controllably linearly adjusting filter weight parameters of the response characteristic filter of said filter in accordance with an imaginary component in the output of said filter so as to drive said imaginary component to zero.

11. A method according to claim 9, wherein said filter comprises a decimation filter stage connected in cascade with a finite impulse response filter stage, said decimation filter stage being operative to decimate the signal sample output of said analog-to-digital converter to be applied to said finite impulse response filter, said finite impulse response filter comprises a multitap filter stage, and wherein step (b) comprises adjusting complex weights associated with multitaps of said finite impulse response filter stage by a least mean square error-based filter parameter adjustment operator.

12. A method according to claim 6, wherein said signal receiver has first and second input signal paths and wherein said clock recovery phase lock loop is coupled to control timing recovery for each of said first and second signal paths to which said input signals are respectively applied, each signal path including a respective finite impulse response filter, the outputs of which are combined and coupled in cascade with a signal squaring circuit, the output of said signal squaring circuit being operative to control said timing recovery loop clock generator, and wherein step (a) comprises monitoring the combined output of said finite impulse response filters for the presence of a signal component that effectively causes conjugate antisymmetry in the spectrum of the monitored combined signal, and wherein step (b) comprises, in response to the combined outputs of said finite impulse response filters containing a signal component that effectively causes conjugate antisymmetric components in the spectrum of combined signals output by said filter, adjusting the filter response characteristic of each of said finite impulse response filters so as to cause the spectrum of combined signals produced by said finite impulse response filters and coupled to said squaring circuit to have conjugate symmetry.

13. A method according to claim 12, wherein said signal receiver includes first and second inputs arranged to be coupled to a full-duplex communication link and provides said first signal corresponding to a detected voltage signal component and said second signal corresponding to a detected current signal component.

14. A method according to claim 13, wherein step (b) comprises controllably linearly adjusting filter weight parameters of the response characteristics of said filters in accordance with an imaginary component in the combined outputs of said filters so as to drive said imaginary component to zero.

15. An apparatus for reducing timing jitter in a clock recovery phase lock loop having a timing recovery loop clock generator comprising:
an adjustable lowpass finite impulse response filter coupled in cascade with a signal squaring circuit, the output of said signal squaring circuit being operative to control said timing recovery loop clock generator; and
a filter adjustment operator being coupled to monitor the output of said lowpass finite impulse response filter for the presence of a signal component that effectively causes conjugate antisymmetry in the spectrum of the monitored signal of interest and, in response to the output of said lowpass finite impulse response filter containing a signal component that effectively causes conjugate antisymmetric components in the spectrum of signals output by said filter, adjusting the filter response characteristic of said finite impulse response filter so as to cause the spectrum of signals produced by said finite impulse response filter and coupled to said squaring circuit to have conjugate symmetry.

16. An apparatus according to claim 15, wherein lowpass finite impulse response filter is a multitap filter and said filter adjustment operator is operative to controllably adjust weighting parameters of the response characteristic filter of said filter so that the filter transfer function seen by the squaring circuit is effectively conjugate symmetric.

17. An apparatus according to claim 15, wherein said signal of interest is sampled and digitized by an analog-to-digital converter, a sampling clock for said analog-to-digital converter being controlled by said timing recovery loop clock generator, and wherein said clock recovery phase lock loop is a second order phase lock loop.

18. An apparatus according to claim 16, wherein said filter adjustment operator is operative to controllably linearly adjust filter weight parameters of the response characteristic filter of said filter in accordance with an imaginary component in the output of said filter so as to drive said imaginary component to zero.

19. An apparatus according to claim 15, wherein said filter comprises a decimation filter stage connected in cascade with a finite impulse response filter stage, said decimation filter stage being operative to decimate the signal sample output of said analog-to-digital converter to be applied to said finite impulse response filter, said finite impulse response filter comprises a multitap filter stage, and wherein said filter adjustment operator is operative to adjust complex weights associated with multitaps of said finite impulse response filter stage by a least mean square error in an imaginary component in the output of said filter so as to drive said imaginary component to zero.

20. An apparatus according to claim 15, wherein said signal receiver has first and second input signal paths and wherein said clock recovery phase lock loop is coupled to control timing recovery for each of said first and second signal paths to which said input signals are respectively applied, each signal path including a respective finite impulse response filter, the outputs of which are combined and coupled in cascade with a signal squaring circuit, the output of said signal squaring circuit being operative to control said timing recovery loop clock generator, and wherein said filter adjustment operator is operative to monitor the combined output of said finite impulse response filters for the presence of a signal component that effectively causes conjugate antisymmetry in the spectrum of the monitored combined signal and, in response to the combined outputs of said finite impulse response filters containing a signal component that effectively causes conjugate antisymmetric components in the spectrum of combined signals output by said filter, adjusting the filter response characteristic of each of said finite impulse response filters, so as to cause the spectrum of combined signals produced by said finite impulse response filters and coupled to said squaring circuit to have conjugate symmetry.

21. An apparatus according to claim 20, wherein said signal receiver includes first and second inputs arranged to be coupled to a full-duplex communication link and provides said first signal corresponding to a detected voltage signal component and said second signal corresponding to a detected current signal component.

22. An apparatus according to claim 21, wherein said filter adjustment operator is operative to controllably linearly adjust filter weight parameters of the response characteristics of said filters in accordance with an imaginary component in the combined outputs of said filters so as to drive said imaginary component to zero.

* * * * *